United States Patent
Choi

(10) Patent No.: US 9,807,364 B2
(45) Date of Patent: Oct. 31, 2017

(54) SUPPORT BAR FOR VIRTUAL REALITY CAMERA

(71) Applicant: Hae-Yong Choi, Seoul (KR)

(72) Inventor: Hae-Yong Choi, Seoul (KR)

(*) Notice: Subject to any disclaimer, the term of this patent is extended or adjusted under 35 U.S.C. 154(b) by 0 days.

(21) Appl. No.: 15/057,264

(22) Filed: Mar. 1, 2016

(65) Prior Publication Data

US 2016/0261777 A1 Sep. 8, 2016

(30) Foreign Application Priority Data

Mar. 2, 2015 (KR) .................. 10-2015-0028901

(51) Int. Cl.
| | |
|---|---|
| *H04N 5/225* | (2006.01) |
| *H04N 13/02* | (2006.01) |
| *F16M 13/04* | (2006.01) |
| *G03B 17/56* | (2006.01) |
| *F16M 11/10* | (2006.01) |
| *F16M 13/00* | (2006.01) |

(52) U.S. Cl.
CPC ......... *H04N 13/0203* (2013.01); *F16M 11/10* (2013.01); *F16M 13/00* (2013.01); *F16M 13/04* (2013.01); *G03B 17/563* (2013.01); *H04N 5/2251* (2013.01); *H04N 5/2259* (2013.01); *F16M 2200/041* (2013.01)

(58) Field of Classification Search
CPC .. F16M 13/04; G03B 17/563; H04N 13/0203; H04N 5/2251; H04N 5/2259
See application file for complete search history.

(56) References Cited

U.S. PATENT DOCUMENTS

| 5,742,859 A * | 4/1998 | Acker ................... F16M 13/04 348/E5.025 |
| 7,241,060 B2 * | 7/2007 | Mootz .................. F16M 11/041 248/187.1 |
| 8,534,934 B1 * | 9/2013 | Carney ................. F16M 11/02 248/178.1 |
| 9,030,149 B1 * | 5/2015 | Chen ..................... F16M 13/04 318/638 |
| 2004/0223078 A1 * | 11/2004 | Zadok ................... F16M 13/04 348/375 |
| 2005/0201744 A1 * | 9/2005 | DeSorbo .............. F16M 11/041 396/419 |
| 2007/0050139 A1 * | 3/2007 | Sidman ................ F16M 11/041 318/649 |
| 2009/0257741 A1 * | 10/2009 | Greb ..................... F16M 13/04 396/55 |

(Continued)

*Primary Examiner* — Amy Hsu
(74) *Attorney, Agent, or Firm* — Bacon & Thomas, PLLC

(57) ABSTRACT

A support bar for virtual reality camera, including a mounting case on which the virtual reality camera is mounted; rotation shafts which are arranged on both ends of a weight center of the mounting case and rotates the mounting case up and downward; a balance weight arranged on a lower part of a weight center of the mounting case; a support plate which connects the rotation shaft and a support bar to rotate the mounting case front and rearward; and a rotation control device on the rotation shaft. A magnet is provided on one side of the rotation shaft and a magnetic body such as steel is provided on the other side; and a wide view sight photographing lens on an upper one side of the mounting case, which has a view angle of front rear and left right 360°.

13 Claims, 9 Drawing Sheets

(56) References Cited

U.S. PATENT DOCUMENTS

| | | | |
|---|---|---|---|
| 2010/0079101 A1* | 4/2010 | Sidman | F16M 11/041 318/649 |
| 2010/0165173 A1* | 7/2010 | Ishii | H04N 5/2254 348/344 |
| 2011/0249964 A1* | 10/2011 | Wood | F16M 11/10 396/421 |
| 2014/0285656 A1* | 9/2014 | Zink | H04N 5/2252 348/84 |
| 2014/0288694 A1* | 9/2014 | Wagner | F16M 11/18 700/213 |
| 2014/0333719 A1* | 11/2014 | Williams | H01L 27/14625 348/36 |
| 2014/0333773 A1* | 11/2014 | Davis | H04N 5/2252 348/158 |

* cited by examiner

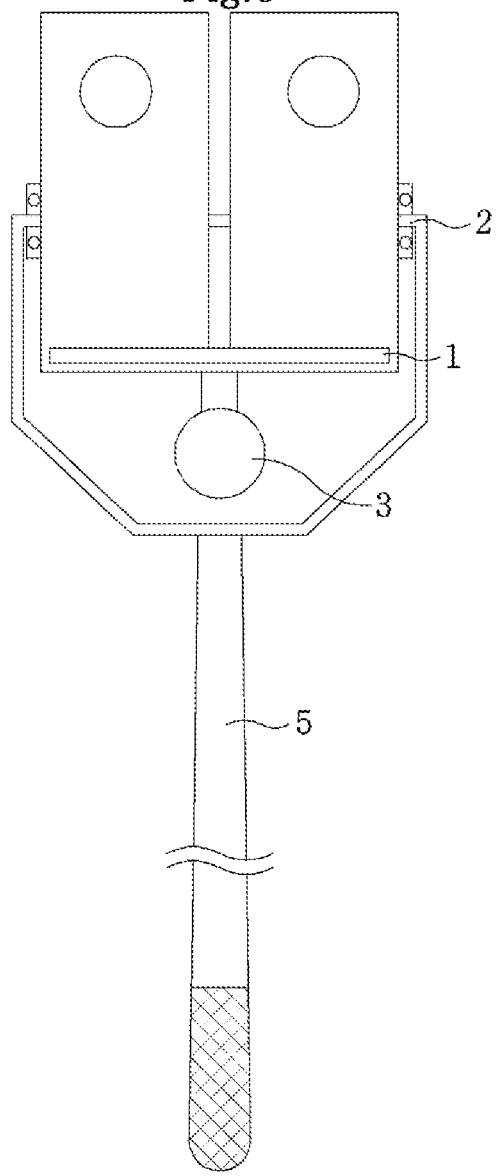

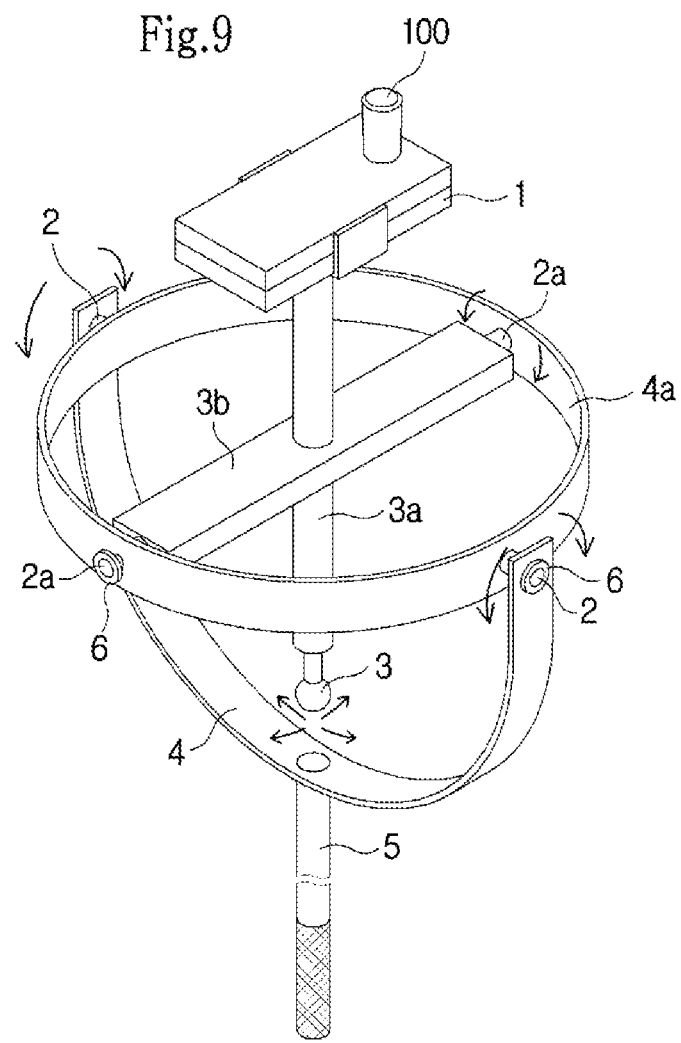

SUPPORT BAR FOR VIRTUAL REALITY CAMERA

CROSS-REFERENCE TO RELATED APPLICATION

This application claims priorities of Korean Patent Application No. 10-2015-0028901, filed on Mar. 2, 2015 in the Korean Intellectual Property Office, which is hereby incorporated by reference in its entirety.

BACKGROUND OF THE INVENTION

This invention relates to a support bar for a virtual reality camera, and more particularly, to a support bar for a virtual reality camera photographing subjects at front rear and left right 360°, through which the photographing locations are raised so as to photograph the subjects 360° and the front rear and left right photographing states is kept horizontally without vibration at the raised photographing locations.

DESCRIPTION OF THE RELATED ART

Generally, a self-camera bar has been developed and used, on which a smart phone is arranged, however the self-camera bar according to a related art cannot be used for a camera for virtual reality which has to photograph simultaneously the subjects at front rear and left right 360° since the bar does not have a function of keeping the camera horizontally. Specially, the camera for virtual reality is difficult to be kept horizontally when the camera is connected to the structures of a vehicle, a backpack, hat or cap and used while it is moved on a road, stair or slope.

Further, a general smart phone or a general camera has a photographing angle of 30-60° and thus it can photograph the subjects at 360°.

SUMMARY OF THE INVENTION

The virtual reality camera has to photograph simultaneously the subjects at front rear and left right 360, however, there is no proper support bar for the camera.

In order to ensure view angle of front rear and left right 360° the virtual reality camera has to photograph the subjects at a raised location and further to be kept horizontally so as to photograph the subjects as a stable view angle of front rear and left right 360°. Additionally, there has to be no shaking of the camera while the camera is kept horizontally.

Considering the above matters, the support bar for a virtual reality camera according to the present invention is provided with: a mounting case on which a camera is mounted; a rotation shaft which rotates front and rearward based on a weight center of the mounting case; a balance weight arranged on a lower part of the mounting case; and a rotation control device including a magnet and a magnetic body for controlling properly the rotation of the mounting case and provided on the rotation shaft.

Further, the support bar for a virtual reality camera of the present invention further includes a wide view sight adapter lens having a wide view angle of front rear and left right 360° for preparing to be used for a general smart phone or a general camera.

In more detail, as shown in FIGS. 1-9, a support bar for a virtual reality camera on which a 2D or 3D photographing device is mounted for photographing subjects at front rear and left right 360° may include: a mounting case 1 on which the virtual reality camera is mounted; rotation shafts 2 which are arranged on left and right ends of the mounting case 1 and rotate the mounting case 1 up and downward; a balance weight 3 arranged on a lower part of a weight center of the mounting case 1; a support plate 4 which connects the rotation shaft 2 and a support bar 5 to rotate the mounting case 1 front and rearward; and a support bar 5 which is connected to a lower center of the support plate 4, wherein the weight center of the photographing device is varied by the rotation shaft 2 and the balance weight 3 while the photographing device moves such that the photographing device is kept always horizontally.

Further, the support bar for a virtual reality camera of the present invention may further include a wide view sight photographing lens 100 on an upper one side of the mounting case 1, which has a view angle of front rear and left right 360°, and a rotation control device 6 on the rotation shaft 2 wherein a magnet is provided on one side of the rotation shaft 2 and a magnetic body such as steel is provided on the other side thereof.

Meanwhile, a length of the support bar 3a which is provided on a lower end of the mounting case 1 and supports the balance weight 3 is varied such that a weight center of the balance weight 3 is varied.

The support bar may be connected to a structure such as a hat, cap, or helmet, which is wearable on a head, a structure such as a back pack or suspender, which is suspended on a human body, and one of transportation means such as a vehicle, bus, ship, bicycle, cart, or drone.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 6 is a view of a support bar for virtual reality camera according to a third embodiment the present invention;

FIG. 9 is a view of a support bar for virtual reality camera according to a sixth embodiment the present invention.

DETAILED DESCRIPTION OF THE INVENTION

Figure 1:
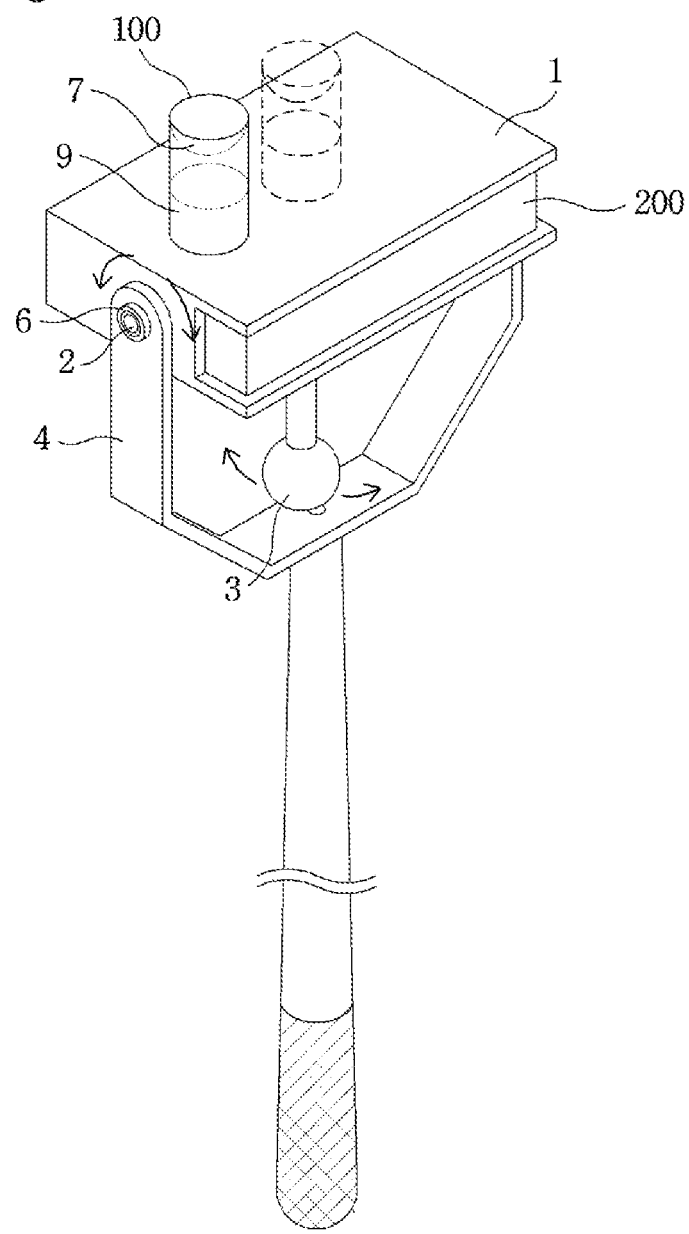
FIG. 1 is a perspective view of a support bar for virtual reality camera according to the present invention.

Exemplary embodiments of the present invention will be described below in detail with reference to the accompanying drawings. Wherever possible, the same reference numerals will be used to refer to the same elements throughout the specification, and a duplicated description thereof will be omitted.

Figure 2:
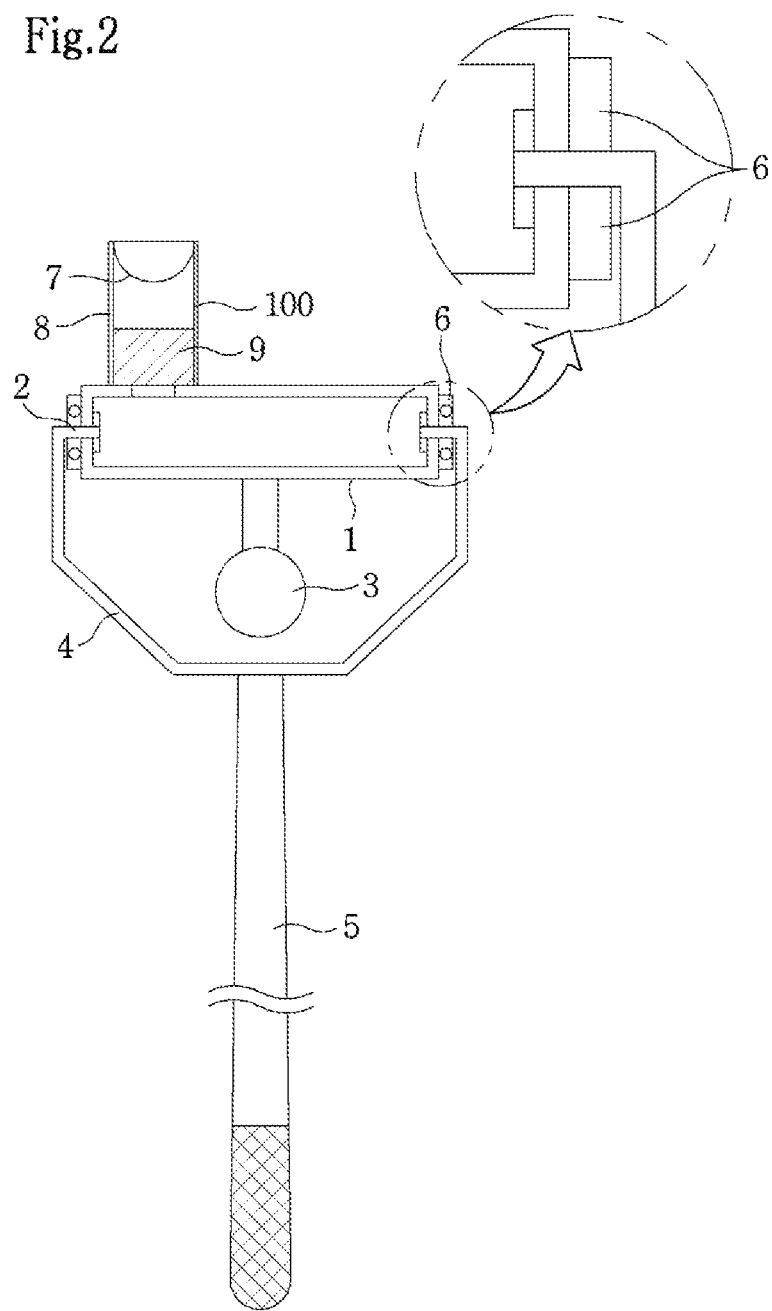
FIG. 2 is a side view of a support bar for virtual reality camera according to the present invention.
Figure 4:
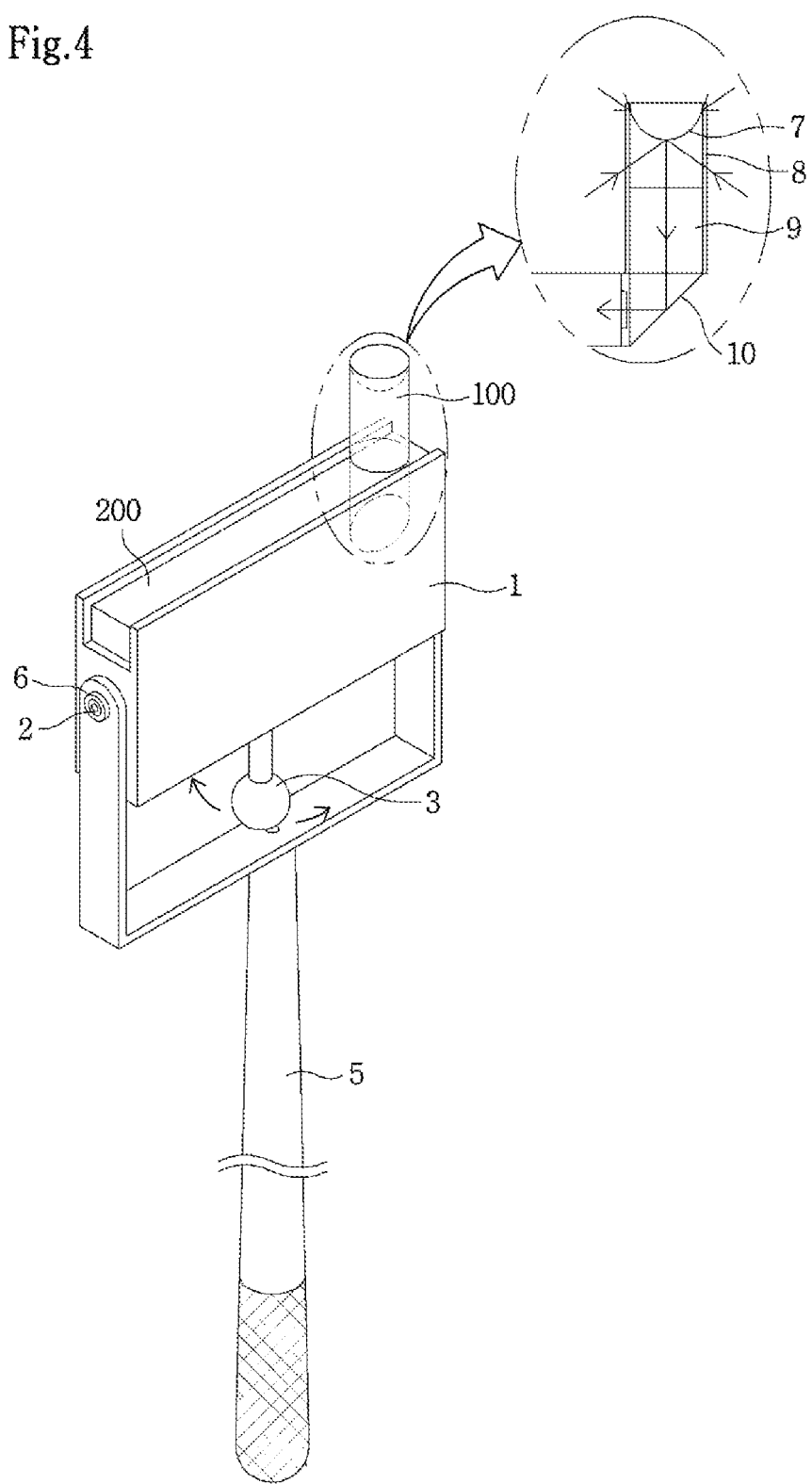
FIG. 4 is a view of a support bar for virtual reality camera according to a first embodiment the present invention.

As shown in FIGS. 1, 2 and 4, a support bar for virtual reality camera according to the present invention may include: a mounting case 1 on which a smart phone 200 or a camera is mounted; a rotation shaft 2 for keeping the camera mounted on the mounting case 1 to be horizontal while it moving-photographs the subjects; a balance weight 3 that moves to be located at a weight center with gravity; a rotation control device 6 made of magnet or magnetic body and for controlling the rotation; and a support bar 5 for ensuring view sight of the mounting case 1 at a raised location at front rear and left right 360°.

Again, as shown in FIGS. 1, 2 and 4, the support bar for virtual reality camera further includes a wide view sight photographing lens 100 having view sight angle of front rear and left right 360° at a front of lens of camera or smart phone 200 having a general view angle and thus the subjects can be photographed at front rear and left right 360° even with a general camera lens.

Further, in a case where a photographing device having a general photographing angle not wide photographing angle is used as the photographing device 300, the wide view sight photographing lens 100 may be useful.

Figure 3:
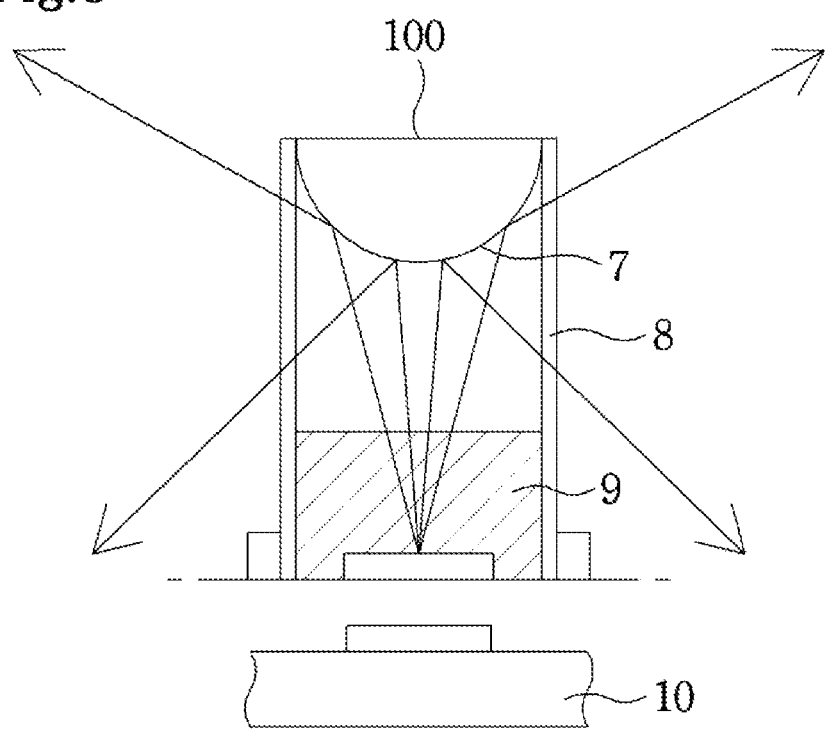
FIG. 3 is a view of a wide view angle lens according to the present invention.

The wide view sight photographing lens 100 may include; spherical mirror 7 having a view angle of 160° or more at an upper end thereof; a transparent tube 8 for fixing the interval and location of the spherical mirror 7; and a view sight limitation body tube 9 which is arranged below the transparent tube 8 and shields the view sight of surrounding image by making only the image from the spherical mirror 7 to be incident to the camera lens of the photographing device 200, as shown in FIG. 3.

As shown in FIGS. 1 and 2, the wide view sight photographing device 100 is arranged at an upper end of the camera lens of the photographing device such that the location of the wide view sight photographing lens 100 is corresponded to the camera lens of the photographing device with respect to optical axis when the photographing device is inserted into the mounting case 1.

As shown in FIG. 4, the wide view sight photographing lens 100 is configured such that the mounting case 1 for the photographing device is erected vertically, the balance weight 3 is arranged therebelow, and the rotation shafts 2 are arranged on left and right sides of the mounting case 1 wherein a prism or a reflection mirror 10 is connected to a lower part of the wide view sight photographing lens 100, as shown in FIG. 3.

As shown in FIG. 1, a 3D camera or a 3D smart phone is mounted on the mounting case 1 and the wide view sight photographing lens 100 as shown in FIG. 3 or the wide view sight photographing lens 100 having the reflection mirror 10 as shown in FIG. 4 is arranged as a plurality on an upper end of the mounting case 1 so that 3D image is photographed at front rear and left right 360°.

That is, according to the support bar for virtual reality camera of the present invention, as shown in FIGS. 1, 2 and 4, when the wide view sight photographing lens 100 is connected to a general camera device, the camera can be converted into a virtual reality camera through which the subjects is photographed at front rear and left right 360°, and when the disclosed photographing device such as a smart phone is a 3D photographing device which is provided with photographing lens for left eye and right eye and the wide view sight photographing lens 100 is further provided thereon, 3D image can be photographed.

Figure 5:
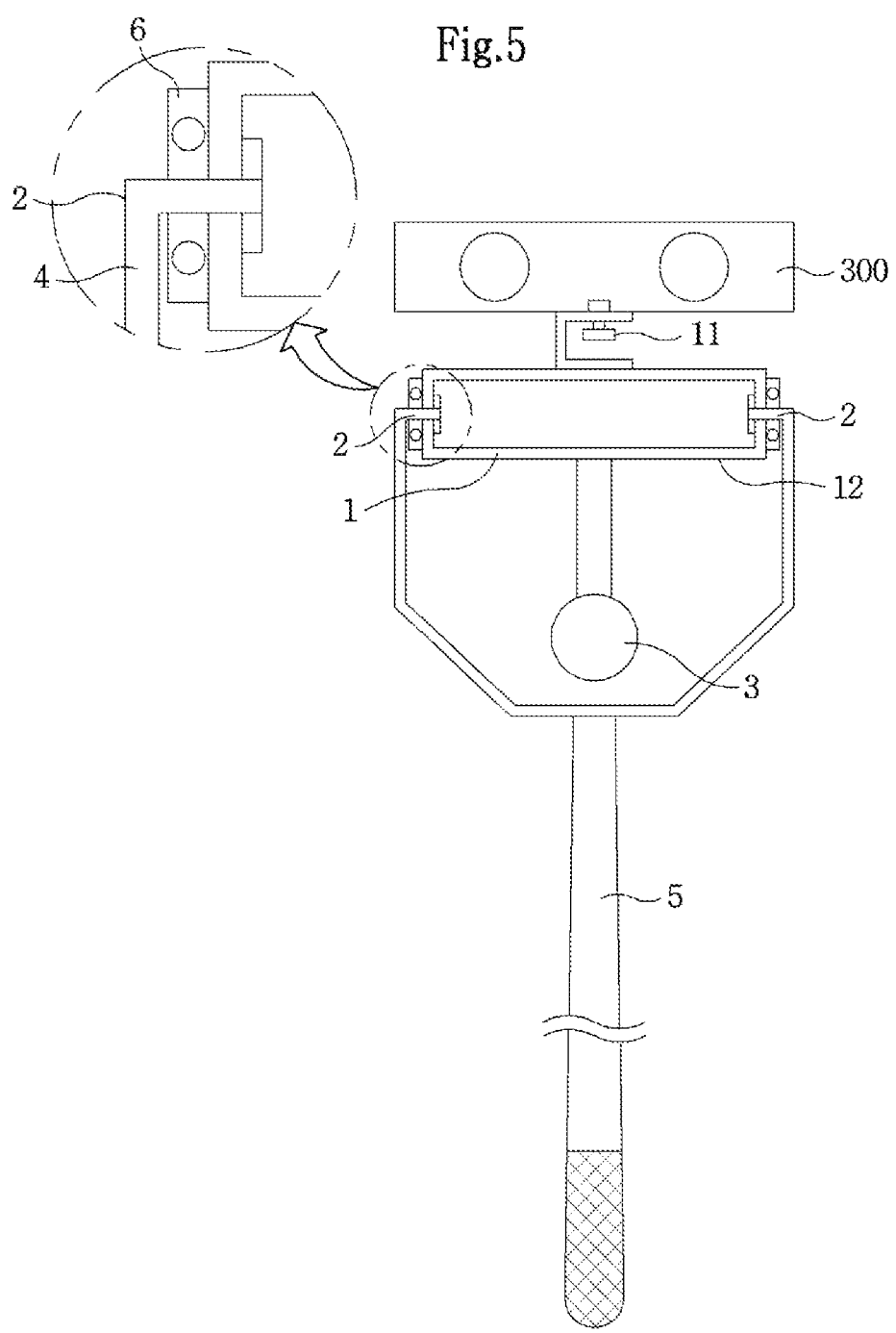
FIG. 5 is a view of a support bar for virtual reality camera according to a second embodiment the present invention.

FIGS. 5 and 6 show a case where the disclosed camera for photographing 3D image at a view sight angle of 360° is connected to the structure of the present invention.

As shown in FIGS. 5 and 6, a fastening device 11 for fastening the photographing device capable of photographing 3D image at 360° by using the image photographing device for left eye and right eye to respective components of FIGS. 5 and 6 is provided, the balance weight 3 is provided at a lower weight center of the fastening device 11 and a supporting plate 12 provided with a rotation shaft 2 through which the balance weight 3 is movable in accordance with the weight center thereof is provided.

The photographing view sight angle of front rear and the left right 360° of the virtual reality photographing device has to be kept horizontally.

Figure 7A:
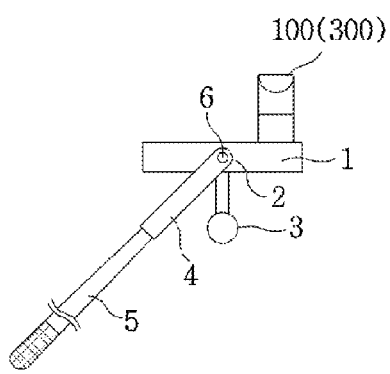
FIGS. 7A, 7B, and 7C are views illustrating a horizon keeping operation while it moving-photographs the subjects according to the present invention.
Figure 7B:
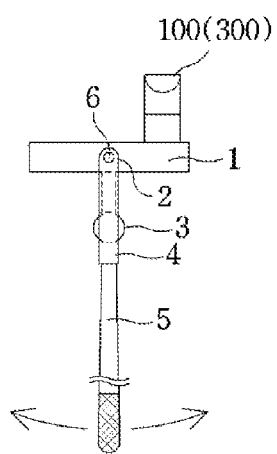
Figure 7C:
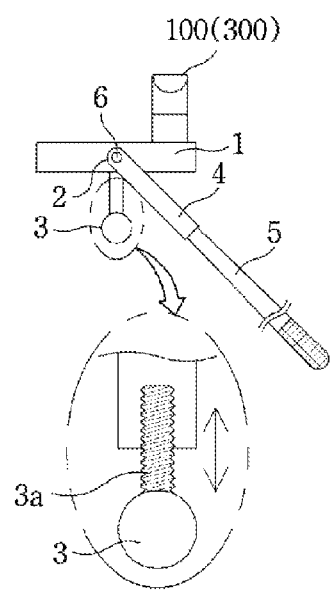

For this purpose, when the vertical state of the support bar 5 as shown in FIG. 7B is inclined frontward as shown in FIG. 7A, or is inclined rearward as shown in FIG. 7C, the mounting case 1 on which the photographing device is mounted is always kept horizontally through the rotation shaft 2 and the balance weight 3.

Here, the rotation shafts 2 are provided on left and right sides of a weight center of the mounting case 1, the balance weight 3 is provided on a lower part of the mounting case 1 and the support bar 5 for ensuring left and right view sight angle of front rear and left right 360° at a raised height is provided.

According to the present invention, as shown in FIGS. 7A-7C, when a user climbs on a stair, mountain or while he/she carries the support bar 5, or drives a vehicle on which the support bar 5 is mounted, the vertical state of the support bar 5 is varied depending on various factors such as the road conditions.

Meanwhile, the photographing camera has to photograph virtual reality image not only in one direction but also at front rear and left right 360°, and when the front direction is inclined, the opposite direction is not a rear direction and the photographing direction is directed toward upward and thus the mounting case has to be kept horizontally.

A user may install the photographing device 300 on the mounting case 1 and photographs the subject while he/she carries the support bar 5 wherein the control force of a magnet of the rotation shaft 2 and the force of center movement of the balance weight 3 have to be balanced properly so at to keep always the mounting case 1 to be horizontal.

In this case, when the balance weight 3 is rotated for horizontally, it may be shaken due to its moving acceleration, causing the image to be photographed to be shaken. In order to avoid this phenomenon a rotation control device 6 is provided between the rotation shaft 2 and the mounting case 1.

For example, a magnet is provided on one side of the rotation shaft 2 and a magnetic body such as steel is provided on the corresponding part of the mounting case 1, and the acceleration force while the mounting case 1 is rotated is controlled such that the mounting case is moved only to the extent as same as the force to be applied by the balance weight 3 and thus a stable horizontal image can be photographed without vibration.

Further, referring to the rotation control device 6 the material which is resistant-abrasion and controllable such as urethane may be used instead of the magnet and the magnetic body, or co-used together with them.

When the balance weight 3 has large weight, it may be used stably without the rotation control device 6.

In this case, as shown in FIG. 7C, the weight center of the balance weight 3 may be moved by varying a length of a support bar 3*a* of the balance weight 3.

The principle described above is applied to all structures of the present invention and can be accomplished by the embodiments below.

Embodiment 1

Referring to the force balance for horizontal movement of the photographing device, the weight center of the photographing device 300 is varied by the weight of the photographing device 300.

Accordingly, as shown in FIG. 7C, the force of the balance weight 3 is adjusted by varying the length of the balance weight 3.

That is, when it is difficult for the balance weight 3 to be moved since the photographing device 300 is heavy, a length of a supporting plate of the balance weight 3 is to be long, and when the photographing device 300 is light and the balance weight 3 is moved easily comparing to magnetic force, the length of the supporting plate of the balance weight 3 is to be short. Here, the device for varying the length of the supporting plate of the balance weight 3 is not limited thereto but applied to various ways within the principle described above.

Embodiment 2

Figure 8A:
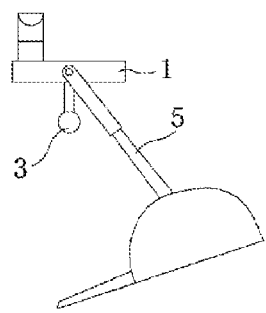
FIG. 8A is a view of illustrating a support bar for virtual reality camera according to the present invention, which is connected to a cap.

When the support bar for virtual reality camera configured as described above is connected to a hat, cap or helmet, as shown in FIG. 8A, the mounting case 1 on which the camera is mounted is always kept horizontally even when a user wearing the cap lowers his/her head or tilts his/her head back.

In this case, the user may use freely his/her both hands and further the photographing device can be kept always horizontally due to the structures of the balance weight 3 and the rotation shaft 2 even when the height of the photographing device is varied due to road condition or the user climbs on or goes down a stair or seats on a chair.

Embodiment 3

Figure 8B:
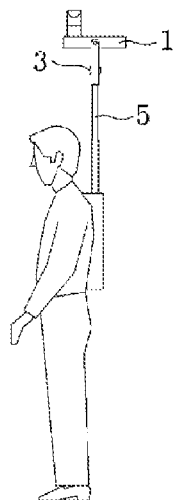
FIG. 8B is a view of illustrating a support bar for virtual reality camera according to the present invention, which is connected to a suspender.

As shown in FIG. 8B, the support bar for virtual reality camera may be connected to a suspender or a back pack.

In this case, the photographing device can be kept always horizontally due to the structures of the balance weight 3 and the rotation shaft 2 even when the height of the photographing device is varied due to road condition or the user climbs on or goes down a stair or seats on a chair.

Embodiment 4

Figure 8C:
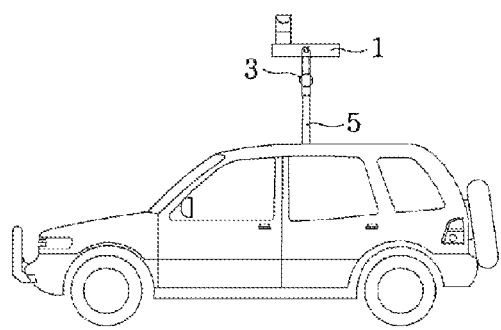
FIG. 8C is a view of illustrating a support bar for virtual reality camera according to the present invention, which is connected to a transportation means such as a vehicle.

As shown in FIG. 8C, the support bar for virtual reality camera may be connected to transportation means such as a vehicle, ship, train or bus.

In this case, the photographing device can be kept always horizontally due to the structures of the balance weight 3 and the rotation shaft 2 even when the height of the photographing device is varied due to road condition or the user climbs on or goes down a stair or seats on a chair.

Embodiment 5

Figure 8D:
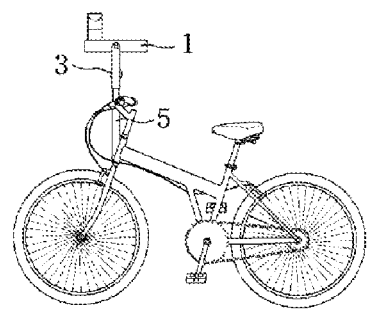
FIG. 8D is a view of illustrating a support bar for virtual reality camera according to the present invention, which is connected to a moving means such as a bicycle.

As shown in FIG. 8D, the support bar for virtual reality camera may be connected to a moving means such as a bicycle, auto-bicycle, cart having wheels or drone, and then the horizontal state is kept automatically such that the image for virtual reality can be photographed at front rear and left right 360°.

Accordingly, the support bar for virtual reality camera 5 of the present invention may be carried or connected to a hat, cap, helmet, suspender, back pack, transportation means such as vehicle, ship, train or bus, or moving means such as a bicycle, auto-bicycle or car having wheels. According to the present invention, even in any cases the mounting case 1 on which the photographing device is mounted is kept horizontally by the rotation shaft 2 and the balance weight 3 and further the mounting case is kept horizontally and stably by the rotation control device 6 even when the balance weight 3 is shaken through the acceleration force of the moving means.

Further, a general camera, a general smart phone, or a general 3D camera or a general 3D smart phone can photograph the images at front rear and left right 360° by using the wide view sight photographing lens 100 that is mounted on the mounting case 1 of the present invention.

Embodiment 6

FIG. 9 is a view of an embodiment where even when a virtual reality photographing device is moved to front rear and left right directions based on a horizontal direction, the photographing device is kept horizontally by using principles of a gyroscope and a balance weight movement, and the principle of Embodiment 1 is applied thereto.

As shown in FIG. 9, a smart phone or a camera for virtual reality is mounted on an upper end of a mounting case 1 and a vertical support bar 3*a* is arranged in a vertical lower direction of the mounting case 1, and a balance weight 3 is provided at a lower remote end the vertical support bar 3*a*.

Here, a horizontal support plate 3*b* is provided front and rearward on a middle end of the vertical support bar 3*a*, a horizontal ring 4*a* is provided horizontally on both ends of the horizontal support plate 3*b*, the horizontal support plate 3*b* and the both ends of the horizontal ring 4*a* are connected through a rotation shaft such that the vertical support bar 3*a* is rotated up and downward freely by the horizontal support plate 3*b*.

Referring to the horizontal ring 4*a*, the rotation shafts 2 are connected to both ends of a support plate 4 and thus the horizontal ring is rotated up and downward freely.

Further, a rotation control device 6 made of magnet or urethane is provided to the rotation shaft 2 such that the horizontal ring 4*a* and the horizontal support plate 3*b* are moved up and downward smoothly. According to the present embodiment, even when the mounting case 1 in a horizontal state is moved to front rear and left right directions, the balance weight 3 is moved up and downward based on front rear and left right directions of a horizontal direction to keep the mounting case horizontally.

That is, the mounting case 1 on which a smart phone or a camera for virtual reality is mounted is moved up and downward to be kept horizontally at any locations through the horizontal support plate 3*b* connected to the vertical support bar 3*a*, the balance weight 3, and the support plate 4 and the rotation shaft connected to the horizontal ring 4*a*, and the support ring 4*a* is rotated up and downward at any locations through the rotation shaft 2 connected to the support plate 4.

Accordingly, the support bar for virtual reality camera of the present invention may include: a mounting case 1 on which a camera is mounted; a vertical support bar 3*a* provided vertically below the mounting case 1; a balance weight 3 provided below the vertical support bar 3*a*; a horizontal support plate 3*b* connected to a middle end of the vertical support bar 3*a*; a horizontal ring 4*a* connected to the left and right sides of the horizontal support plate 3*b* through the rotation shafts 2*a*; a support plate 4 connected to a front and rear of the horizontal ring 4*a* through the rotation shafts 2; and a support bar 5 provided below the support plate 4 wherein the all components are operated organically such that the photographing device for virtual reality that is mounted on the mounting case 1 is kept always to be horizontally through the up and down rotation of the balance weight 3 even though the photographing device is moved to front rear and left right directions.

The rotation control device 6 in Embodiment 9, is configured such that as shown in FIG. 2, a magnet is provided on one side of the rotation shaft 2 and a magnet body such as steel is provided on the other side thereof, as shown in FIG. 7C, the length of the support bar 3*a* on a lower end of the mounting case 1 is varied such that the weight center of the balance weight 3 is varied, or as shown in FIGS. 1, 3 and 4, the wide sight photographing lens 100 having wide view angle of front rear and left right 360° is provided on one side of an upper end of the mounting case 1.

Further, the support bar for virtual reality camera of the present embodiment, as shown in FIGS. 8A, 8B, 8C and 8D, may be connected to a hat, cap, helmet, which is wearable on a head, or suspender and back pack, which is carried on a shoulder, or transportation means such as a vehicle, train, ship, bicycle, cart having wheels and drone.

According to the present invention, a conventional smart phone, a general camera, a conventional smart phone can be converted into a camera for virtual reality camera which photographs the subjects at front rear and left right 360°, and further a camera for virtual reality or a disclosed 3D camera for virtual reality, which has a function of photographing the subjects at front rear and left right 360°, can be mounted on the support bar for virtual reality camera such that the camera photographs the subjects at front rear and left right 360° at a raised location. Specially, when a user moves, the camera is kept horizontally such that the balance weight centers the camera in accordance with height and slope surroundings, and the magnet connected to the left and right sides of the rotation shaft keeps the rotation of the rotation shaft to be horizontally so that a user can photograph stably the subjects to be viewed at front rear and left right 360° in any cases.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A support bar for a virtual reality camera on which a 2D or 3D photographing device is mounted for photographing subjects at front rear and left right 360° comprising:
    a mounting case on which the virtual reality camera is mounted;
    rotation shafts which are arranged on left and right ends of the mounting case and rotate the mounting case up and downward;
    a balance weight arranged on a lower part of a weight center of the mounting case;
    a support plate which connects the rotation shaft and a support bar to rotate the mounting case front and rearward; and
    a support bar which is connected to a lower center of the support plate, wherein the weight center of the photographing device is varied by the rotation shaft and the balance weight while the photographing device moves such that the photographing device is kept always horizontally,
    further comprising on a lower part of the mounting case:
    a vertical support bar arranged vertically;
    a balance weight provided below the vertical support bar;
    a horizontal support plate connected to a middle of the vertical support bar;
    a horizontal ring which is connected to left and right sides through the rotation shafts;
    a support plate which is connected to front and rear sides through the rotation shafts; and
    a support bar provided on a lower part of the support plate, wherein the all components are operated organically such that the photographing device is kept horizontally since the location of the balance weight is varied even when the photographing device for virtual reality is moved in front rear and left right directions.

2. The support bar for a virtual reality camera of claim 1, further comprising a rotation control device on the rotation shaft wherein a magnet is provided on one side of the rotation shaft and a magnetic body such as steel is provided on the other side thereof.

3. A support bar for a virtual reality camera on which a 2D or 3D photographing device is mounted for photographing subjects at front rear and left right 360° comprising:
    a mounting case on which the virtual reality camera is mounted;
    rotation shafts which are arranged on left and right ends of the mounting case and rotate the mounting case up and downward;
    a balance weight arranged on a lower part of a weight center of the mounting case;
    a support plate which connects the rotation shaft and a support bar to rotate the mounting case front and rearward; and
    a support bar which is connected to a lower center of the support plate, wherein the weight center of the photographing device is varied by the rotation shaft and the balance weight while the photographing device moves such that the photographing device is kept always horizontally,
    wherein a length of the support bar which is provided on a lower end of the mounting case and supports the balance weight is varied such that a weight center of the balance weight is varied.

4. The support bar for a virtual reality camera of claim 1, further comprising a wide view sight photographing lens on an upper one side of the mounting case, which has a view angle of front rear and left right 360°.

5. The support bar for a virtual reality camera of claim 1, wherein the support bar is connected to a structure such as a hat, cap, or helmet, which is wearable on a head.

6. The support bar for a virtual reality camera of claim 1, wherein the support bar is connected to a structure such as a back pack or suspender, which is suspended on a human body.

7. The support bar for a virtual reality camera of claim 1, wherein the support bar is connected to one of transportation means such as a vehicle, bus, ship, bicycle, cart, or drone.

8. The support bar for a virtual reality camera of claim 1, further comprising a rotation control device on the rotation shaft wherein a magnet is provided on one side of the rotation shaft and a magnetic body such as steel is provided on the other side thereof.

9. The support bar for a virtual reality camera of claim 1, wherein a length of the support bar which is provided on a lower end of the mounting case and supports the balance weight is varied such that a weight center of the balance weight is varied.

10. The support bar for a virtual reality camera of claim 1, further comprising a wide view sight photographing lens on an upper one side of the mounting case, which has a view angle of front rear and left right 360°.

11. The support bar for a virtual reality camera of claim 1, wherein the support bar is connected to a structure such as a hat, cap, or helmet, which is wearable on a head.

12. The support bar for a virtual reality camera of claim 1, wherein the support bar is connected to a structure such as a back pack or suspender, which is suspended on a human body.

13. The support bar for a virtual reality camera of claim 1, wherein the support bar is connected to one of transportation means such as a vehicle, bus, ship, bicycle, cart, or drone.

* * * * *